United States Patent [19]
Fisk

[11] 3,711,987
[45] Jan. 23, 1973

[54] BUG CATCHER AND EJECTOR

[76] Inventor: Edwin J. Fisk, 36260 Lake Shore Blvd. Apt. 114, Eastlake, Ohio 44094

[22] Filed: Sept. 17, 1970

[21] Appl. No.: 72,984

[52] U.S. Cl. ................................................43/134
[51] Int. Cl. ..............................................A01m 5/02
[58] Field of Search.................43/134, 135, 139, 4

[56] References Cited

UNITED STATES PATENTS

| 3,184,878 | 5/1965 | Senne | 43/4 |
| 454,720 | 6/1891 | Dexter | 43/139 |
| 1,329,534 | 2/1920 | McGrath | 43/135 |
| 1,797,557 | 3/1931 | Stine et al | 43/139 |
| 3,231,997 | 2/1966 | Shugarman | 43/134 |
| 3,486,264 | 12/1969 | Mounier et al | 43/4 |

Primary Examiner—Warner H. Camp

[57] ABSTRACT

A suction type bug catcher and ejector comprising a manually operated piston in a cylinder having a bug confining cell which holds bugs captive that are caught with the air drawn into the cylinder by the inward movement of the piston. An air vent is provided to exhaust the air from the cylinder and bug confining cell when moving the piston outwardly to reset it for a subsequent suction stroke. The bugs captured are ejected from the confining cell when the piston is moved forcefully outward while the vent is closed.

2 Claims, 5 Drawing Figures

PATENTED JAN 23 1973 3,711,987
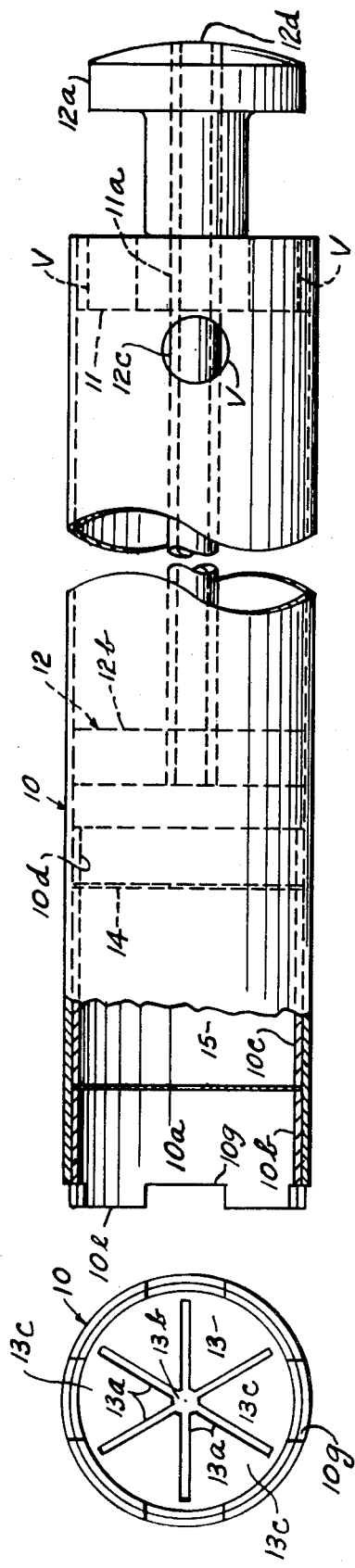
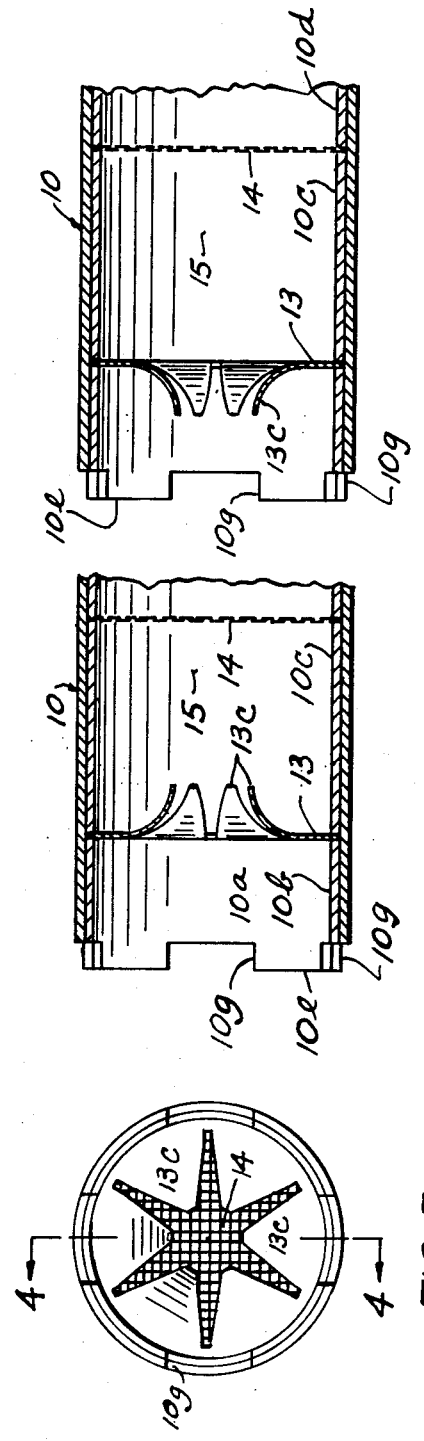
INVENTOR.
Edwin J. Fisk

BUG CATCHER AND EJECTOR

This invention relates to the capture and disposal of bugs and insects in general such as flies, hornets, spiders, crickets and roaches that may be present in an abode for people, or any enclosure reserved for people such as a vehicle, home or tent.

The principle object is to provide mechanical means instead of poisonous spray to destroy unwanted bugs in stores, restaurants, nurseries, hospitals, schools and living place where poisonous spray would be harmful to the inhabitants and/or damaging to food.

Another object is to provide means for the capture of bugs whether they are moving or at rest, without the need of squashing them to make them inactive.

Another object is to provide means for the entrapping of crawling, hopping and flying bugs, by the flow of ambient air into a bug confining cell by suction, and subsequently ejecting such bugs by a forceful expulsion of air from the means, to effect their demise.

Another object is to provide means for the entrapping of insects in a chamber having a flexible self-closing trap gate which is normally closed but will open by a substantial flow of air, to admit or eject insects.

Other advantages and objects of the invention will be apparent from the following description and accompanying drawing in which:

FIG. 1 is a side elevation, partly in section, which shows the trap gate in a normal and closed position;

FIG. 2 is an end view of FIG. 1;

FIG. 3 is an end view similar to FIG. 2 but with the trap gate shown open during the inflow of air;

FIG. 4 is a sectional view taken on line 4—4 in FIG. 3 showing trap end portion of the invention;

FIG. 5 is a sectional view similar to FIG. 4 but with the trap gate shown open during the expulsion of air.

Referring in greater detail to the drawing and FIGS. 1 through 5, the invention comprises a hollow cylindrical body 10 which has at one end a cap 11 with a centrally disposed hole 11a to slidably support a piston rod 12c of piston 12. The piston rod 12c has a piston head at one end arranged to be manually reciprocated within the body 10. The opposite and outwardly extending end of the piston rod 12c has a handle 12a for this purpose. The reciprocating movement of the piston head 12b will cause a flow of air through the open end 10a of the body 10 in same direction the piston head is moved, to draw in by suction, air and insects into the body 10, and/or expel air, ejecting any insect that had been drawn into the body 10.

The open end 10a of the body 10 incorporates a flexible diaphragmatic member 13, herein referred to as trap gate, and a screen barrier 14, in spaced relation to form a bug confining cell 15.

The trap gate 13 is preferably placed in from the open end rim 10e of the body 10 to provide the area 10a as an air and bug channeling mouth. Spacer sleeves 10b and 10c are provided to maintain a necessary spaced relation between the rim 10e of the body 10, the trap gate 13 and the screen barrier 14. A stop ring 10d is provided to locate the screen barrier 14 a required distance from the rim 10e. The spacer sleeves 10b and 10c and the stop ring 10d are fastened to the body by an adhesive medium.

The rim 10e of the body 10 and the sleeve 10b is undercut to form embrasures or recesses 10g to allow the inflow of air into the body 10 during a time when the rim 10e has been placed over an insect or bug and against a wall or window glass.

The trap gate 13 is provided with radially disposed slots 13a diverging from a central hole 13b to form flexible sectors 13c, which normally remain flat and perpendicular to the body 10, as shown in FIGS. 1 and 2, in which position it forms a barrier between the open end 10a of the body 10 and the confining cell 15.

In use, the open end 10a of the body 10 is moved into the proximity of a bug to be captured, whether it is crawling or flying, at which time the handle 12a of the piston 12 is pulled forcefully a few inches, to cause a violent inflow of air into the body 10, and through the trap gate 13 enlarging the central hole 13b, as shown in FIGS. 3 and 4, to admit bugs and insects caught in the consequent air turbulence of the inflow.

The piston rod 12c is preferably tubular to provide an air vent from the face of the piston head 12b to the opening 12d at the end of the handle 12a. The opening of the piston rod air vent 12d is covered by the users thumb or palm during the time the piston is moved to intake or expel air when in the act of capturing or ejecting bugs that were captured.

When, in operation, the piston movement is stopped, the trap gate will spring back to its normal flat shape because the flow of air has stopped; thereby confining any captured bug in the cell 15, as defined by the trap gate barrier 13, the screen barrier 14 within the body 10.

To keep bugs that have been captured within the confines of the cell 15 while capturing still another, the air vent opening 12d in the piston rod 12c is left uncovered and the piston 12 is then moved to its original air and bug intake position, at which time the air vent 12d is again covered. Thus, the piston 12 can be reset for capturing additional bugs by venting the air within the body 10 through the piston rod 12c, without opening the trap gate 13, and inadvertently release those bugs already confined in the cell 15.

To eject the captured bugs from the cell 15, the piston 12 is drawn back in a direction away from the body 10, and with the piston rod vent opening 12d covered by thumb or palm, the piston is forcefully pushed intermittently a few inches at a time, to cause violent gusts of outflowing air through the cell 15, bending the flexible sectors 13c of the trap gate 13, as shown in FIG. 5, enlarging the central hole 13b to provide an egress for the bugs being blown from the cell 15.

The space within the body 10 between the cap 11 and the piston head 12b is provided with air vents v, in the body 10 and the cap 11.

I claim:

1. A suction type bug catcher and ejector comprising a hollow cylindrical body member having a cap at one end and is open at the opposite end and a bug confining cell therein consisting of a self-closing gate which opens to a forceful flow of air, and a screen barrier; a piston arranged to be manually reciprocated within the body member by a piston rod slidably mounted in the cap, to cause a forceful flow of air inwardly or outwardly of the body member through the said open end and self-closing gate and confining cell, in response to a like movement of the piston; and an air vent extending from the body member ahead of the piston throughout the length of the piston rod, a vent opening at the end of the piston rod opposite of the piston, arranged to be covered or uncovered to change the directional flow of air from the body member when the piston is moved toward the open end of the body member.

2. A suction type bug catcher and ejector comprising a hollow cylindrical body member having a cap at one end and is open at the opposite end and a bug confining cell therein consisting of a self-closing gate which opens to a forceful flow of air, and a screen barrier; a piston arranged to be manually reciprocated within the body member by a piston rod slidably mounted in the cap, to cause a forceful flow of air inwardly or outwardly of the body member through the said open end and self-closing gate and confining cell in response to a like movement of the piston; the rim of the said open end of the body member having recessed portions to allow the inflow of air when the said open end has been blocked.

* * * * *